Figure 1:
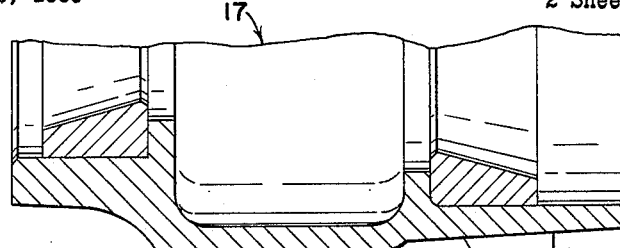

Dec. 19, 1961 D. A. WALTHER 3,013,842
TWO-PIECE RIM CLAMP
Filed Nov. 10, 1959 2 Sheets-Sheet 1

INVENTOR.
DANIEL A. WALTHER
BY *Ely, Frye D Hamilton*
ATTORNEYS

Dec. 19, 1961 D. A. WALTHER 3,013,842
TWO-PIECE RIM CLAMP
Filed Nov. 10, 1959 2 Sheets-Sheet 2

INVENTOR.
DANIEL A. WALTHER
BY

ATTORNEYS

United States Patent Office 3,013,842
Patented Dec. 19, 1961

3,013,842
TWO-PIECE RIM CLAMP
Daniel A. Walther, Dayton, Ohio, assignor to The Dayton Steel Foundry Company, Dayton, Ohio, a corporation of Ohio
Filed Nov. 10, 1959, Ser. No. 852,125
5 Claims. (Cl. 301—20)

The present invention relates generally to clamping devices for rim and wheel assemblies. More particularly, the invention relates to an improved clamp whereby rims, as used on vehicles such as trucks, tractors, and trailers, may be demountably secured to a wheel. Specifically, the invention relates to a rim clamping device comprising two parts: a universal lever clamping member for each stud size and an interchangeable wedge member in a number of sizes to accommodate the various spacer widths.

The prior art has seen countless types and forms of rim clamps. An early type clamping device comprised a triangular shaped continuous split wedge ring which was securingly inserted between a tapered face at the outer portion of the inner diameter of the rim and a corresponding face on the outer surface of the felly or spokes. The outer surface of this ring was engaged by a series of clamping lugs which could be tightened against the ring by appropriately located nuts and bolts. This type may be seen, for example, in U.S. Patent No. 1,869,635.

Later the use of a wedge ring per se was substantially replaced by clamping lugs with a radially outer wedging surface adapted to have sliding engagement with the flange of a wheel. This type clamping device may be seen, for example, in U.S. Patent No. 2,874,997.

The one-piece clamping unit did lower the cost and substantially improve the ease of mounting and demounting the rim or rims from the wheel, but did not cure all the chronic maintenance problems inherent to rim mounting.

There still existed the problem of proper seating of the wedge, especially in one-piece designs, where dimensional variations of rim, wheel and spacers became critical. In such unitary configurations, dimensional variations caused the clamps to be "cocked" in their operative position. This tilting created a load variation to the individual clamps and with each revolution of the wheel the stud carrying a tilted clamp would be flexed by the torque created as that clamp improperly received the weight load. Broken studs, bolts, and clamps resulted.

Devices employing the split ring wedge had similar operational difficulties. Any improper seating of the ring would also cause improper load distribution. The constant flexure of the ring was transmitted to all the clamps; eventually loosening the tightening means and allowing rim slippage.

Therefore, as a solution to these problems it is an object of the present invention to provide a two-piece clamp that is inherently flexible and which will therefore compensate for dimensional variations in rims, wheels and spacers.

It is a further object of the present invention to provide a rim clamp which will not subject the mounting stud to flexing stresses.

It is a further object of the present invention to provide a rim clamp which does not require retightening after initial installation.

It is a still further object of the present invention to provide a rim clamp which can be mounted and demounted with absolute ease.

These and other objects of the invention, as well as the advantages thereof, will be apparent in view of the following detailed description and the attached drawings.

Figure 2:
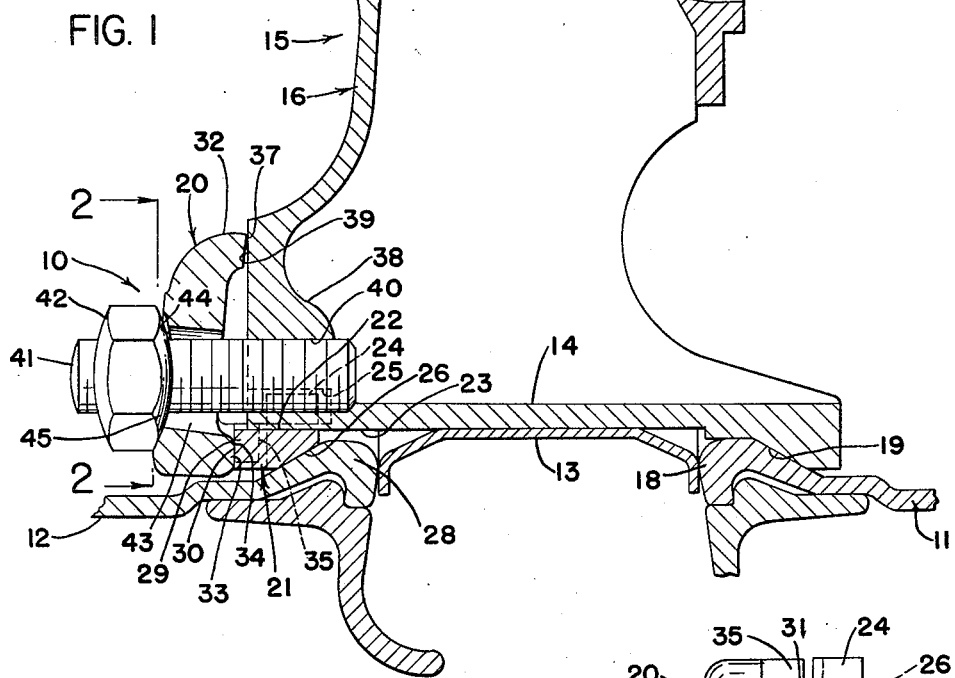
Figure 3:
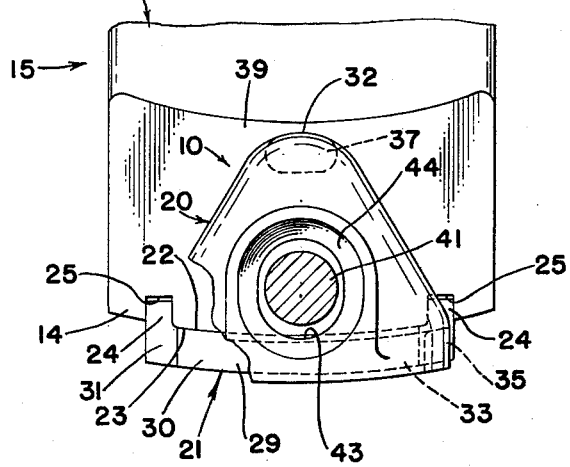
Figure 3:
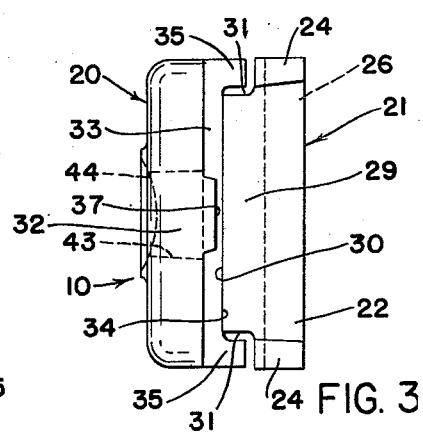
Figure 4:
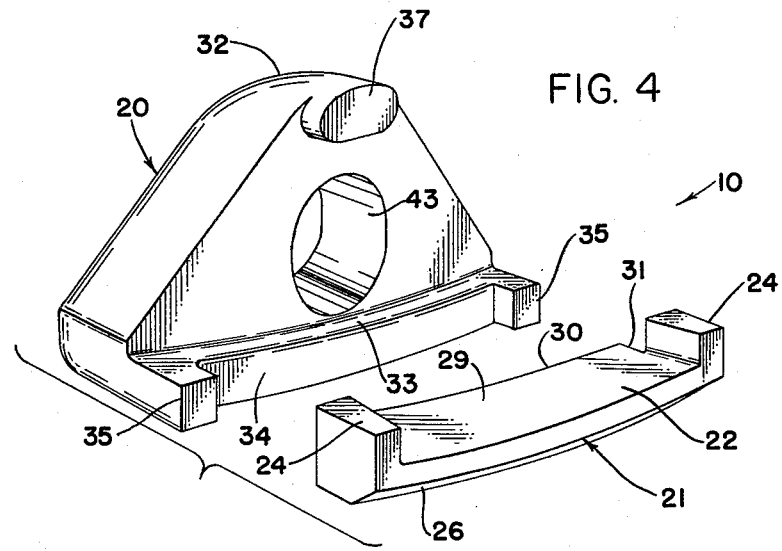
Figure 5:
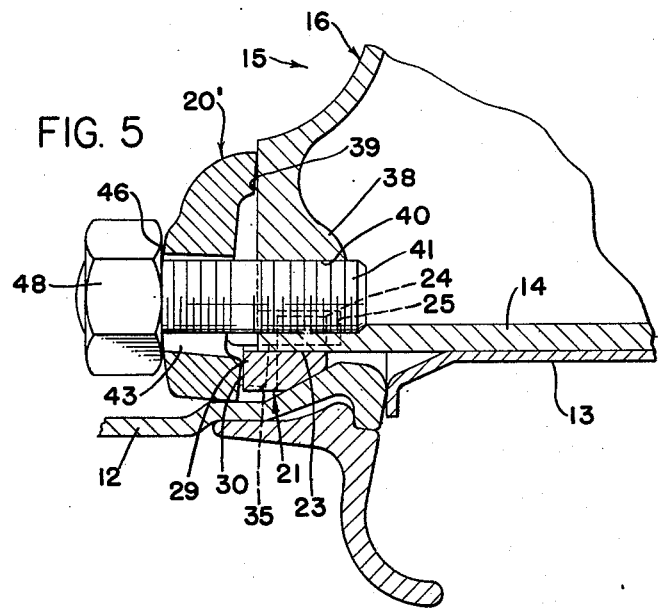

Referring to the drawings:

FIG. 1 is a fragmentary section of the two-piece rim clamp of the invention as used with a dual rim wheel assembly, FIG. 2 is an elevation taken substantially as indicated on line 2—2 in FIG. 1, FIG. 3 is a plan view of the improved rim clamp, FIG. 4 is an exploded perspective view of the improved rim clamp; and FIG. 5 is a fragmentary section of a dual rim wheel assembly showing an alternate form of the improved two-piece rim clamp in operative condition on the wheel.

In general, an improved clamping device for rim assemblies according to the invention comprises two members, a lever member which is mounted radially on the wheel and a wedging member which is positioned axially with respect to the wheel. The wedging member is positioned between the mounting flange of the outer rim and the felly, and is wedged into securing position by tightening the lever member into operative position. The wedging member is prevented from sliding circumferentially from its position by lug projections on the wedging member co-operating with corresponding grooves on the felly and by positioning lugs on the lever member embracing a portion of the wedging member.

Referring now to the drawings, and FIG. 1 in particular, the two-piece rim clamping device, indicated generally by the numeral 10, is installed to secure an inner rim 11 and an interchangeable outer rim 12, separated by a spacer ring 13, in operative condition on the felly 14 of a wheel, indicated generally by the numeral 15. Wheel 15 may have any desired number of spokes 16 and is provided with a conventional hub area 17. An inclined mounting flange 18 of the conventional inner rim 11 is slidably seated on and carried by a standard (e.g., 28°) radially bevelled rim mounting surface 19 on the axially inner portion of wheel felly 14.

The rim clamping device 10 includes a lever member 20 and a wedging member 21. The radially inner surface 22 of wedge member 21 is cylindrical to allow sliding engagement with the radially outer surface 23 of felly 14. Depending axially inward from the ends of wedge member 21 are two lugs 24 which position within axial slots 25 on the surface 23 of felly 14 to prevent wedge member 21 from sliding circumferentially out of operative position.

The axially inner portion of the radially outer surface of wedging member 21 defines a conical surface 26 bevelled the standard 28° for wedging engagement with the inclined mounting flange 28 of an outer rim 12.

As best shown in FIG. 3, the medial portion of a wedge member 21 extends axially outward as indicated at 29 to provide a radially directed surface or front face 30 for engagement with the lever member 20 in operative condition. At either end of surface 30 and axially outward from the lugs 24, the wedge member 21 has relieved corner areas indicated at 31 which provide for interfitting relation of the two clamp parts or members.

The radially oriented or bolt supported lever member 20 is substantially triangular in shape, when viewed as in FIG. 2, and has an apex region 32 and a base region 33. The base region 33 projects axially inward toward the wedge member and includes a recessed medial portion having a radially directed surface or rear face 34 for engagement with surface 30 of the wedge member and a pair of lugs 35 on either side of surface 34 for positioning within the corner areas 31 and thus embrace the axially outermost portion 29 of the wedge member.

The apex region of the member 20 has an axially inwardly projecting heeling shoulder 37. Referring again to FIG. 1, the radially outer portions of the spokes 16, adjacent to the felly 14 terminate in bosses 38. The radially inner, axially outer surface 39 on boss 38 presents a fulcrum on which heeling shoulder 37 may pivot. Each boss 38 is also provided with a threaded bore 40 which enables the clamping device 10 to be secured to the wheel 15, as by stud bolt 41 and ball face nut 42.

Lever member 20 is provided with an axial bore 43 to loosely accommodate stud bolt 41. A concentrically concave surface 44 at the axially outer opening of bore 43 is adapted for engaging the ball face 45 of nut 42.

Heeling is highly advantageous to two-piece rim clamp design. The combination of the flexible contact between lever member 20 and wedge member 21, the heeling, the non-binding of stud bolt 41 within bore 43 and the greater surface contact for force transmission accomplished by the use of ball face nut 42 and engaging surface 44 on lever member 20 eliminates the flexing of stud bolt 41 since by this construction the stresses imparted to bolt 41 are almost completely axial.

Referring now to FIG. 5, an alternate form of tightening means nut and accommodating surface on the lever member are shown. In this configuration of lever member 20', the axially outer end of the bolt receiving bore 43 terminates in a preferably slightly convex surface 46 for engaging a flat surfaced nut 48 which mounts on stud bolt 41.

The rim clamping device herein disclosed is completely interchangeable with any one piece clamp. Lever members 20 and 20' are universal in application—only the diameter of stud bolt 41 introducing any variation. The wedge members 21 are all interchangeable and can be used with any lever member 20 or 20'. Wedge members 21 may be provided in various axial dimension for use with various spacer.

What is claimed is:

1. In combination, a wheel having a felly for mounting rims, a plurality of two piece rim clamping devices, tightening means for interconnecting said rim clamping devices to said wheel, and an inner and outer rim mounted on said felly, said rim clamping device comprising, a lever member mounted radially on said wheel and a wedging member positioned axially on said wheel, a heeling shoulder depending axially inward from the radially inner portion of said lever member, interconnecting means depending axially inward from the radially outer portion of said lever member to prevent said wedging member from sliding circumferentially when said rim clamping device is operably mounted on said wheel, a bore medial of said shoulder and said interconnecting means adapted to accommodate said tightening means, a contacting surface on the axially outer edge of said wedging member adapted for contacting the axially inner surface along the radially outer edge of said lever member, a felly engaging projection depending radially inward from each end of said wedging member and a conical surface on the radially outer portion of said wedging member for engaging the flange of said outer rim.

2. In combination, a wheel having a felly for mounting rims, a two piece rim clamping device, and tightening means for interconnecting said clamping device to said wheel, said rim clamping device comprising, a lever member adapted for mounting radially on said wheel and a wedging member disposed axially to said wheel, a contacting surface on the axially outer edge of said wedging member, a contacting surface on the axially inner surface of said lever member adjacent its radially outer edge adapted for engaging the contacting surface on said wedging member, a felly engaging projection depending radially inward from each end of said wedging member and a conical surface on the radially outer portion of said wedging member for engaging the outer of said rims.

3. In combination, a wheel having a felly for mounting rims, a two piece rim clamping device, and tightening means for interconnecting said clamping device to said wheel, said rim clamping device comprising, a lever member adapted for mounting radially on said wheel and a wedging member disposed axially to said wheel, a contacting surface on the axially outer edge of said wedging member, a contacting surface on the axially inner surface of said lever member adjacent its radially outer edge adapted for engaging the contacting surface on said wedging member, a felly engaging projection depending radially inward from each end of said wedging member, a conical surface on the radially outer portion of said wedging member for engaging the outer of said rims and lugs depending axially inward from the contacting surface on said lever member for interacting with the axially outer portion of said wedging member to prevent circumferential sliding of said wedging member.

4. In combination, a wheel having a felly for mounting rims, a plurality of two piece rim clamping devices, tightening means for interconnecting said rim clamping devices to said wheel, and an inner and outer rim mounted on said felly, said rim clamping device comprising, a lever member mounted radially on said wheel and a wedging member positioned axially on said wheel, a heeling shoulder depending axially inward from the radially inner portion of said lever member, a leg depending axially inward along the base of said lever member, lugs extending axially inward from the ends of said leg, to prevent said wedging member from sliding circumferentially when said rim clamping device is operably mounted on said wheel, a contacting surface medial said lugs, a contacting surface on the axially outer edge of said wedging member, a felly engaging projection depending radially inward from each end of said wedging member and a conical surface on the radially outer portion of said wedging member for engaging the outer of said rims.

5. In combination, a wheel having a felly for mounting rims, a plurality of two piece rim clamping devices, tightening means for interconnecting said rim clamping devices to said wheel, and an inner and outer rim mounted on said felly, said rim clamping device comprising, a lever member mounted radially on said wheel and a wedging member positioned axially on said wheel, a heeling shoulder depending axially inward from the radially inner portion of said lever member, a leg depending axially inward along the base of said lever member, lugs extending axially inward from the ends of said leg, to prevent said wedging member from sliding circumferentially when said rim clamping device is operably mounted on said wheel, a contacting surface medial said lugs, axial grooves on the radially outer surface of said felly, a contacting surface on the axially outer edge of said wedging member, a lug depending radially inward from each end of the wedging member, a cylindrical surface medial said radial lugs for slidingly engaging said felly and a conical surface on the radially outer portion of said wedging member for engaging the outer of said rims.

References Cited in the file of this patent

UNITED STATES PATENTS

| | | |
|---|---|---|
| 1,365,582 | Boles | Jan. 11, 1921 |
| 1,735,290 | Meyer et al. | Nov. 12, 1929 |
| 1,894,248 | White | Jan. 10, 1933 |
| 2,010,238 | Keller | Aug. 6, 1935 |

Notice of Adverse Decision in Interference

In Interference No. 92,606 involving Patent No. 3,013,842, D. A. Walther, Two-piece rim clamp, final judgment adverse to the patentee was rendered Jan. 14, 1964, as to claims 1 and 2.

[*Official Gazette October 27, 1964.*]